(12) United States Patent
Tucker (10) Patent No.: US 11,117,037 B2
(45) Date of Patent: Sep. 14, 2021

(54) CROSS COUNTRY, ROAD RACING, OR OTHER ENDURANCE RUNNING RACE COURSE RATING SYSTEM USING MECHANICAL METHODS

(71) Applicant: John N. Tucker, Lexington, VA (US)

(72) Inventor: John N. Tucker, Lexington, VA (US)

( * ) Notice: Subject to any disclaimer, the term of this patent is extended or adjusted under 35 U.S.C. 154(b) by 609 days.

(21) Appl. No.: 15/877,800

(22) Filed: Jan. 23, 2018

(65) Prior Publication Data

US 2018/0207509 A1 Jul. 26, 2018

Related U.S. Application Data

(60) Provisional application No. 62/450,196, filed on Jan. 25, 2017.

(51) Int. Cl.
| | |
|---|---|
| *A63B 71/06* | (2006.01) |
| *A63B 24/00* | (2006.01) |
| *A63B 69/00* | (2006.01) |
| *G01L 5/00* | (2006.01) |

(52) U.S. Cl.
CPC ...... *A63B 71/0619* (2013.01); *A63B 24/0062* (2013.01); *A63B 69/0028* (2013.01); *G01L 5/00* (2013.01)

(58) Field of Classification Search
CPC .............. A63B 1/0619; A63B 24/0062; A63B 69/0028; G01L 5/00
See application file for complete search history.

(56) References Cited

U.S. PATENT DOCUMENTS

| | | | |
|---|---|---|---|
| 3,846,704 | A | 11/1974 | Bessette |
| 4,028,693 | A | 6/1977 | Kuntz |
| 4,156,971 | A | 6/1979 | Currie et al. |
| 4,343,315 | A | 8/1982 | O'Leary |
| 4,645,458 | A | 2/1987 | Williams |
| 5,091,895 | A | 2/1992 | Chatwin et al. |
| 5,138,589 | A | 8/1992 | Kimbel |
| 5,435,315 | A | 7/1995 | McPhee et al. |
| 6,826,845 | B2 | 12/2004 | Pritchard |

(Continued)

OTHER PUBLICATIONS

"Cross Country, Track and Running Analysis", 1998 [retrieved online Dec. 20, 2007], Cross Country and Running Analysis, 6 pages.

(Continued)

*Primary Examiner* — Regis J Betsch
*Assistant Examiner* — Jeremy A Delozier
(74) *Attorney, Agent, or Firm* — Andrew M. Calderon; Roberts Calderon Safran & Cole, P.C.

(57) ABSTRACT

The present disclosure describes a course difficulty rating method using a mechanical method to obtain an energy differential for obtaining a difficulty rating. More specifically, the present disclosure describes a difficulty rating method used to determine a relative difficulty of a cross country running course or a road racing course using energy information of a self-propelled vehicle. The method includes: obtaining an energy reading of a self-propelled vehicle as it is propelled on a first course; obtaining an energy reading of the self-propelled vehicle at is it propelled over a second course; and comparing the energy readings collected by the self-propelled vehicle over the first course and the second course to determine an energy factor course for the first course.

20 Claims, 5 Drawing Sheets

(56) References Cited

U.S. PATENT DOCUMENTS

| | | | |
|---|---|---|---|
| 6,892,470 B2 | 5/2005 | Olson et al. | |
| 6,997,882 B1 | 2/2006 | Parker et al. | |
| 8,142,197 B2 | 3/2012 | Tucker | |
| 8,622,015 B1 * | 1/2014 | Snyder | G09F 21/02 |
| | | | 116/200 |
| 2003/0201909 A1 | 10/2003 | Hilliard | |
| 2006/0084850 A1 | 4/2006 | Spinner et al. | |
| 2006/0281062 A1 * | 12/2006 | Tucker | G09B 19/00 |
| | | | 434/255 |
| 2012/0232783 A1 * | 9/2012 | Calkins | G01C 21/3469 |
| | | | 701/411 |
| 2015/0224845 A1 * | 8/2015 | Anderson | B60G 17/019 |
| | | | 701/37 |
| 2015/0321084 A1 * | 11/2015 | Galasso | G16H 20/30 |
| | | | 463/6 |

OTHER PUBLICATIONS

"eHow: How to Measure Distance Along a Curved Line", Jun. 2004 [retrieved online Dec. 20, 2007],ehow.com, 2 pages.
Wheeler Lakes, Jun. 2003 [retrieved online Dec. 20, 2007], 2 pages, Amazon.com, 2 pages.
"Foghorn Outdoors: California Hiking", Mar. 2003 [retrieved online Dec. 20, 2007], Amazon.com, 11 pages.

\* cited by examiner

CROSS COUNTRY, ROAD RACING, OR OTHER ENDURANCE RUNNING RACE COURSE RATING SYSTEM USING MECHANICAL METHODS

CROSS REFERENCE TO RELATED APPLICATIONS

The present application is related to U.S. Pat. No. 8,142,197, the contents of which are incorporated by reference in its entirety herein.

FIELD OF THE INVENTION

The present disclosure describes a course difficulty rating method using a mechanical method to obtain an energy differential for obtaining a difficulty rating. More specifically, the present disclosure describes a difficulty rating method used to determine a relative difficulty of a cross country running course or a road racing course using energy information derived from a self-propelled vehicle.

BACKGROUND

In order to be able to evaluate any cross country performance relative to a universal standard the coach needs to have two more pieces of information.
1) an exact and standardized course length, and
2) some way of quantitatively knowing the difficulty of the course.

For the same reason, identical race times run on different courses are seldom equivalent performances. Comparing them objectively also requires the same additional information.

SUMMARY

In an aspect of the disclosure, a method includes: obtaining an energy reading of a self-propelled vehicle as it is propelled on a first course; obtaining an energy reading of the self-propelled vehicle at is it propelled over a second course; and comparing the energy readings collected by the self-propelled vehicle over the first course and the second course to determine an energy factor for the first course.

In an aspect of the disclosure, a method of rating a difficulty of a running course is implemented on a computer and taking the form of a non-transitory computer program product on a non-transitory computer readable storage medium. The method includes: calculating energy costs from a first course test and a second course test; and determining a difficulty rating for the first course that is accurately measured using an energy comparison testing from the calculating energy costs, wherein the difficulty rating is reflected as a percentage of increased energy costs collected by an energy measuring self-propelled vehicle for a known race distance and speed on the first course and for a same distance at a same speed on the second course using the same self-propelled vehicle.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure describes a course difficulty rating method using a mechanical method to obtain an energy differential for obtaining a difficulty rating. More specifically, the present disclosure describes a difficulty rating method used to determine a relative difficulty of a cross country running course or a road racing course using energy information of a self-propelled vehicle.

Course Measurements

The rating method described herein uses a course measurement method as described with respect to U.S. Pat. No. 8,142,197, but now using a mechanical method of obtaining energy. In this these embodiments, amongst other things, flags to measure curves are no longer required due to improvements in course measurements. Instead, the present disclosure can place measuring tape on the line a knowledgeable lead runner would run, or shortest legal route within the course boundaries, being a straight line between curves, and 12 inches inside the innermost boundary, not on the inner boundary, on the curves. This 12-inch setback is identical to the method used on standard 400 meter tracks to measure the official distance of lane one, the innermost lane. Other measurement methods are also contemplated herein to ensure that a same distance is measured (or calculated) for both a cross country course or road course and a comparison track (e.g., conventional race track of a flat nature (for example, a 400 meter race track)).

Energy Data Collection and Comparison

The methods described herein provide a novel method of energy data collection and comparison. Specifically, the mechanical method as described herein, is a non-metabolic method, utilizing self-propelled vehicles such as, but not limited to, electric bicycles, tricycles, golf carts, remote controlled or other similar vehicles where the unit of energy measured might be in Watts or Kilojoules or other mechanical power or energy metrics.

By implementing the novel method of energy data collection and comparison, it is now possible to improve on a rating system and, more particularly, to a cross country or road racing course difficulty rating system to assist athletes in assessing performance as described in U.S. Pat. No. 8,142,197. By way of example, it is now possible using a mechanical device, e.g., self-propelled vehicle, instead of human subjects, to accurately measure and compare the difference in energy costs required to traverse an exact distance and speed on a typical cross country course and then again on a standard track, e.g., 400 meter track, at exactly the same speed and distance. These energy cost differentials, reflected as a percentage of increased energy used, between the cross country course or road racing course will be compared and correlated and will reflect the difficulty of that course as described further herein (and in U.S. Pat. No. 8,142,197). Accordingly, by using the methods described herein, performance on rated courses now can be accurately and intelligibly compared, without the human factor variability, e.g., waning energy levels, fitness, etc. of a human; instead, using the self-propelled vehicle as described herein, it is now possible to obtain a more accurate energy level for certain distances on the cross country course or road racing course and the comparison track.

Figure 1:
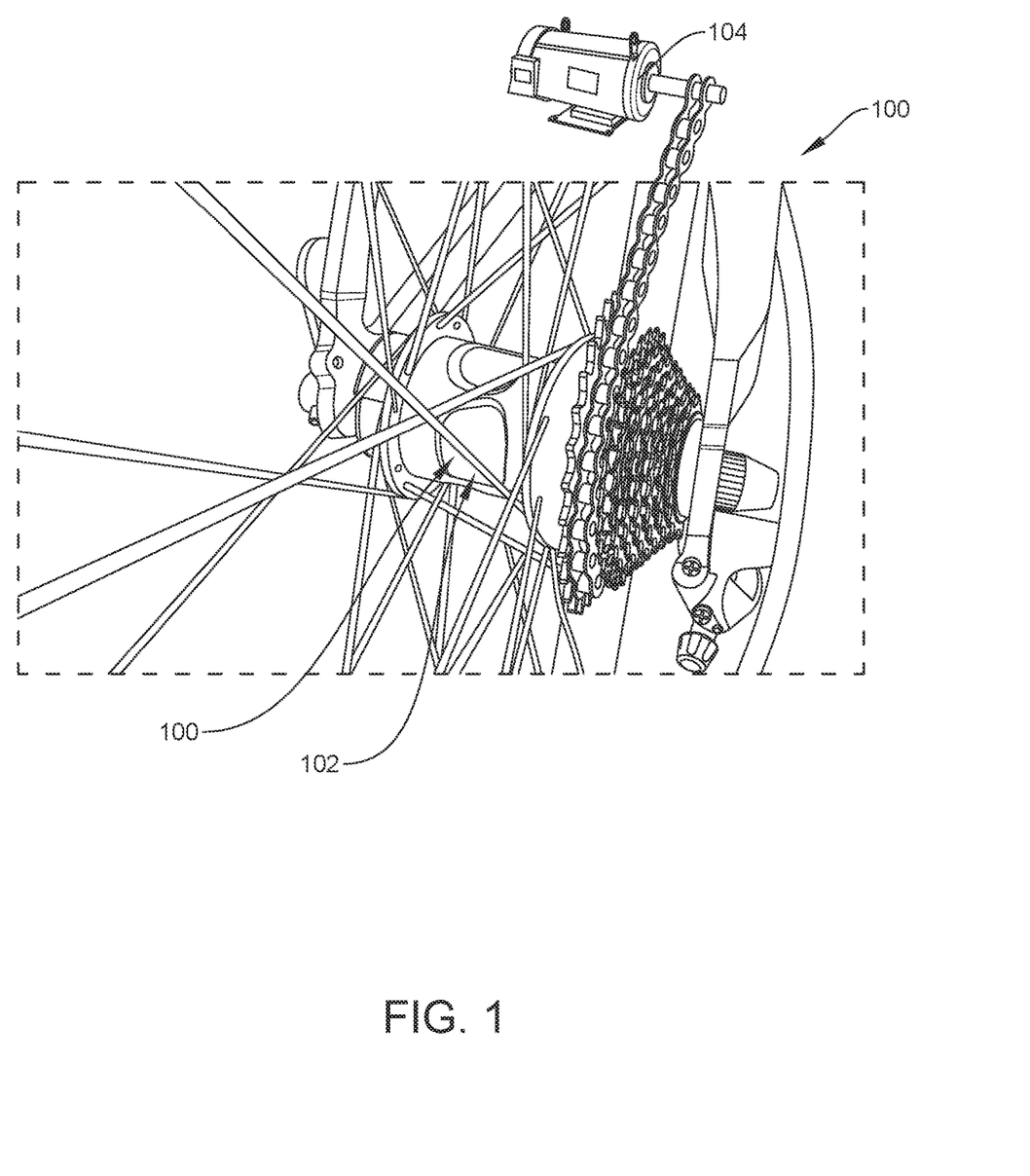
FIG. 1 shows a power meter used with a self-propelled vehicle, in accordance with aspects of the invention.

FIG. 1 shows a power meter 100 used with a self-propelled vehicle 10 in accordance with aspects of the invention. By way of one example, the energy data collection devise described herein can be any self-propelled vehicle 10 such as a standard "mountain" bicycle equipped with an electric motor 104 which may have a regenerative or other braking feature to cause the motor to work even if the bicycle or other self-propelled vehicle is going downhill. As already described herein, the self-propelled vehicle 10 can alternatively be any electric bicycle, tricycle, golf carts, or other perhaps remotely controlled vehicle where the units of energy measured might be in Watts or Kilojoules or other mechanical power or energy metrics.

In addition to the electric motor 104, the self-propelled vehicle 10 will have, in this embodiment, a power meter 100, e.g., commercially available under the brand name CycleOps Power Agent, which can be adapted for use to accurately measure how much power a motor (e.g., electric motor 104) or cyclist is putting into their rides, analyze workouts, and target training and racing speeds. The power meter 100 can be a torque sensing electronic device on a rear hub 102 of the vehicle which replaces the standard rear bicycle hub (see FIG. 1). The power meter 100 can also be mounted at different locations, depending on the type of self-propelled vehicle 10. For example, the power meter 100 can be mounted at any location (e.g., at a wheel, chain, gear, etc.) which can sense, measure, and transmit the energy to a computing device as shown in FIGS. 2 and 3, for example.

In embodiments, as should be recognized by those of skill in the art, the power meter 100 at the rear hub 102 senses, in this embodiment, measures and transmits the amount of torque in Watts and Kilojoules, applied to the rear (drive) wheel axle or hub 102, via a standard bicycle chain connecting the rear (power meter) hub 102 to the front pedal driven sprocket normally driven by the cyclist. More specifically and by way of example, in the mechanical method of rating the difficulty of a cross country course or road racing course, the torque to the rear hub 102 is supplied via the same standard bicycle chain but now by an electric motor 104 installed on the bicycle turning the front pedal driven sprocket instead of the cyclist. What was a standard bicycle is now an electric motor driven bike.

The power from the electric motor 104 can be controlled by the rider, who can apply variable or constants amounts of (electrical) power or torque to an electronic torque sensing rear wheel hub, e.g., power meter 100, which detects, measures, transmits and records that torque data in two different energy metrics. These energy metrics can be in kilojoules or watts, as examples; although other energy levels are also be contemplated herein. This same or similar detecting, measuring, transmitting and recording by use of the power meter 100 is also applicable to alternative self-propelled vehicles, whether it be sensing the energy of a motor at a chain, belt, gear system or other locations, as examples.

Figure 2:
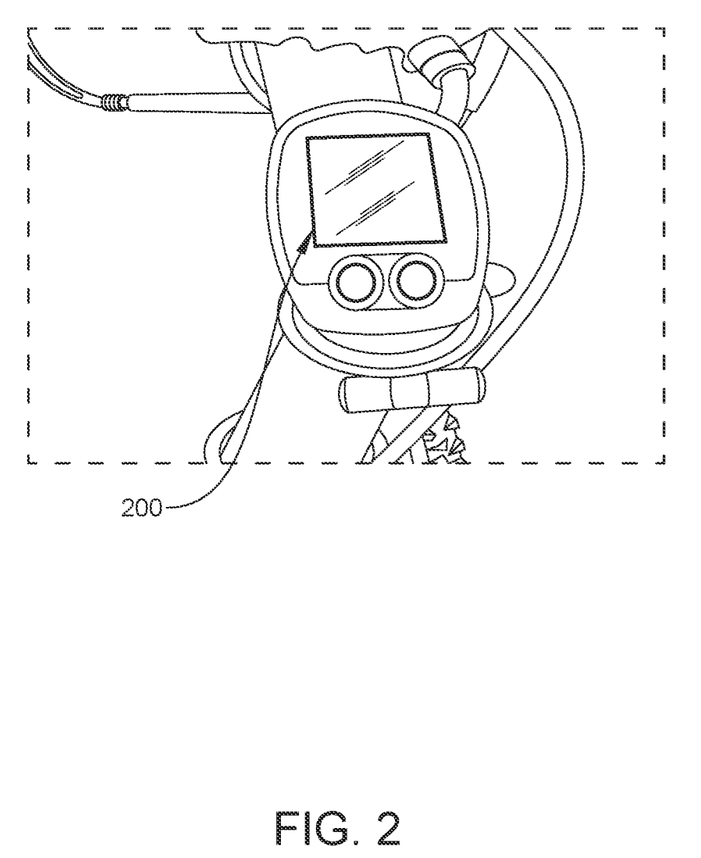
FIG. 2 shows a computing device which is connected to the power meter to capture energy information in accordance with aspects of the invention.
Figure 3:
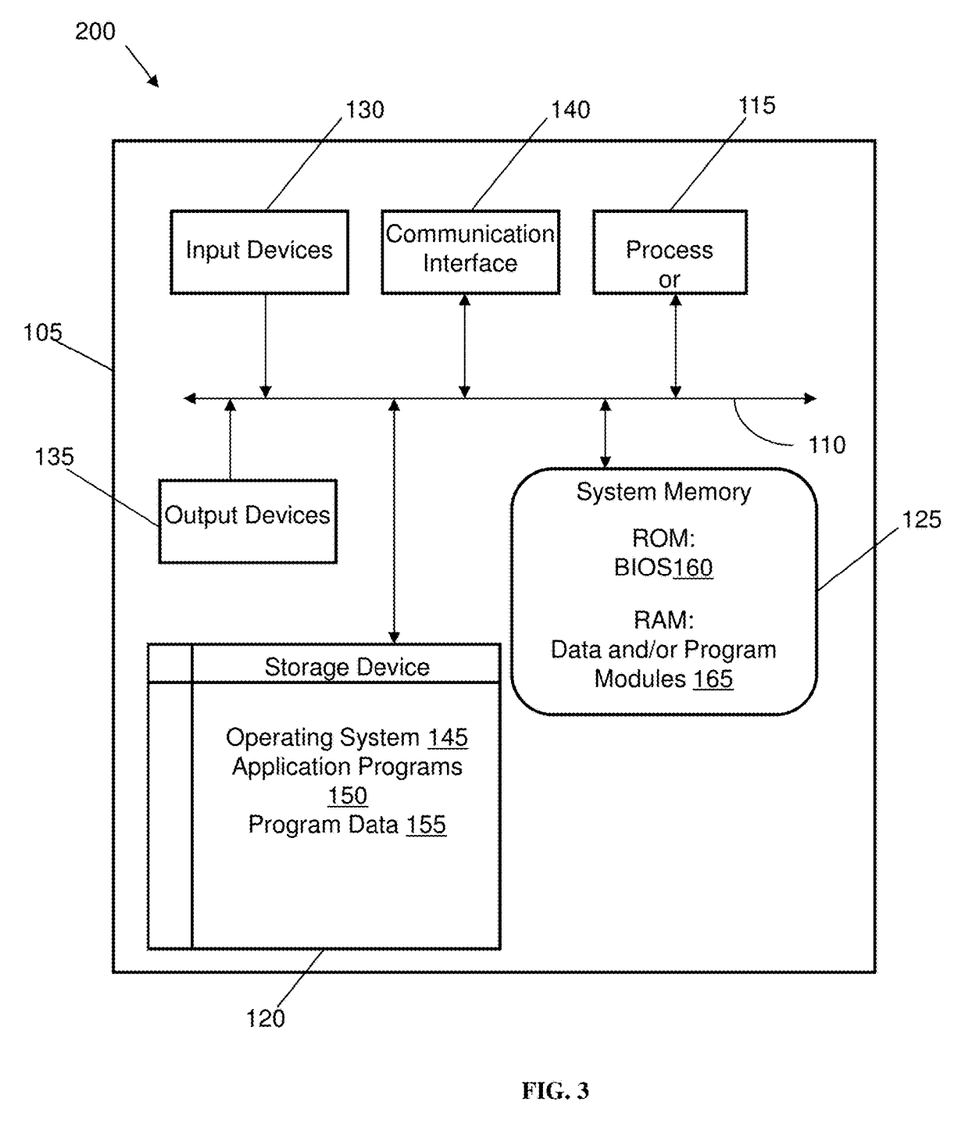
FIG. 3 shows an illustrative computing environment for implementing the steps in accordance with aspects of the invention.

As shown in FIG. 2, the data collected from the power meter 100 can be transmitted, e.g., wired or wirelessly, by the power meter 100 to a computer, e.g., computing device 200, mounted to the vehicle. In the case of a self-propelled bicycle, for example, the computing device 200 (also referred to as a On Board Computer) can be mounted on the handlebars. In embodiments, the wireless connection can be, e.g., Bluetooth or other wireless connections known to those of skill in the art. For example, Bluetooth provides a WPAN for interconnecting the components described herein. Zig-Bee can also be used, which is a low-cost, low-power, wireless mesh network standard targeted at the wide development of long battery life devices in wireless control and monitoring applications.

In embodiments, an exemplary and non-limiting On Board Computer 200 is presented in FIG. 3. The On Board Computer 200 shown in FIG. 3 is only one example of a suitable computing system and is not intended to suggest any limitation as to the scope of use or functionality of the invention. As shown in FIG. 3, On Board Computer 200 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present invention, which may be operatively implemented by the computer readable program instructions. For example, the processor can provide energy calculations. In embodiments, processor 115 may receive input signals from one or more input devices 130 (e.g., including the power meter rear hub 100) and/or drive output signals through one or more output devices 135. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention In embodiments, storage device 120 may store operating system 145, application programs 150, and program data 155 in accordance with aspects of the present invention. The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

Still referring to FIG. 3, the one or more input devices 130 may further include one or more mechanisms that permit an operator to input information to computing device 105, such as, but not limited to, a touch pad, dial, click wheel, scroll wheel, touch screen, one or more buttons (e.g., a keyboard), mouse, track ball, microphone, camera, in addition to the power meter 100.

The communication interface 140 may include any transceiver-like mechanism (e.g., a network interface, a network adapter, a modem, or combinations thereof) that enables computing device 105 to communicate with remote devices or systems, such as the power meter rear hub 100 and other computing devices such as, for example, a server in a networked environment, e.g., cloud environment. For example, computing device 105 may be connected to remote devices or systems via one or more local area networks (LAN) and/or one or more wide area networks (WAN) using communication interface 140.

The computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

By way of example, the computing device and more specifically the program modules 165 in combination with the processer(s) 115 can provide the functionality of the present invention. By way of example use, the self-propelled vehicle is driven while maintaining a constant speed and a known distance over a precisely measured cross country course or a road race course and then again on a track, e.g., as a non-limiting example, on a standard 400 meter track. The distance and speed can be recorded and stored in memory or storage device 120. The user of the self-propelled vehicle will maintain a constant speed on the track. The processor 115, for example, can determine or establish an average speed on the course, which can be recorded and stored in memory or storage device. The energy expended by the self-propelled vehicle is sensed, measured and transmitted to the computing device, e.g., recorded and stored in memory or storage device 120.

The self-propelled vehicle is then driven at a constant speed on a standard 400 meter track as a non-limiting example (e.g., comparison track which is flat), duplicating the previously recorded average speed or constant speed on the cross country course or road racing course again on a standard 400 meter track. The energy expended by the self-propelled vehicle on the comparison track is sensed, measured and transmitted to the computing device, e.g., recorded and stored in memory or storage device 120. This calculation can be performed, e.g., by the processor 115, with program code of the, e.g., program module 165.

Once energy measurements such Watts and/or Kilojoules, etc. are obtained (by the power meter) for both the first course (e.g., cross country or for the road race course) and the second course, e.g., comparison track, and transmitted to the computing device 200, it is possible to now make a comparison between these measured energies. A percentage can then be calculated with will be a percentage increase difference. The percentage increase difference can be a rating of the cross country course or the road course. For example, the higher the percentage will be a more difficult course; whereas, the smaller the percentage will be a less difficult course.

In an example formula or calculation:

(i) A total energy in Watts and/or Kilojoules at a constant speed for a known distance on a cross country course or road racing course are obtained;

(ii) A total energy in Watts and/or Kilojoules at the constant speed for the known distance thereof is obtain for the comparison track;

(iii) Subtract the total energy obtained on the comparison track from the cross country course or road racing course to obtain a differential energy between the track and the course; and (iv) Using the number obtained by the subtraction in step (iv), a percentage of increase energy is obtained by dividing the subtracted number by the energy obtained on the comparison track number thereby obtain the energy percentage differential. The energy percentage differential of increased energy cost can be used to compute a course rating.

The system herein described can be integrated into current on-line systems over a network which may include the Internet, an intranet, an extranet, WAN, LAN, satellite or wireless communications, and/or the like. The invention could be used in conjunction with any type of personal computer, network computer, workstation, minicomputer, mainframe, or the like running any operating system. The invention may be embodied as a computer program product. Accordingly, the invention may take the form of an entirely software embodiment, an entirely hardware embodiment, or a combination thereof. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

Figure 4:
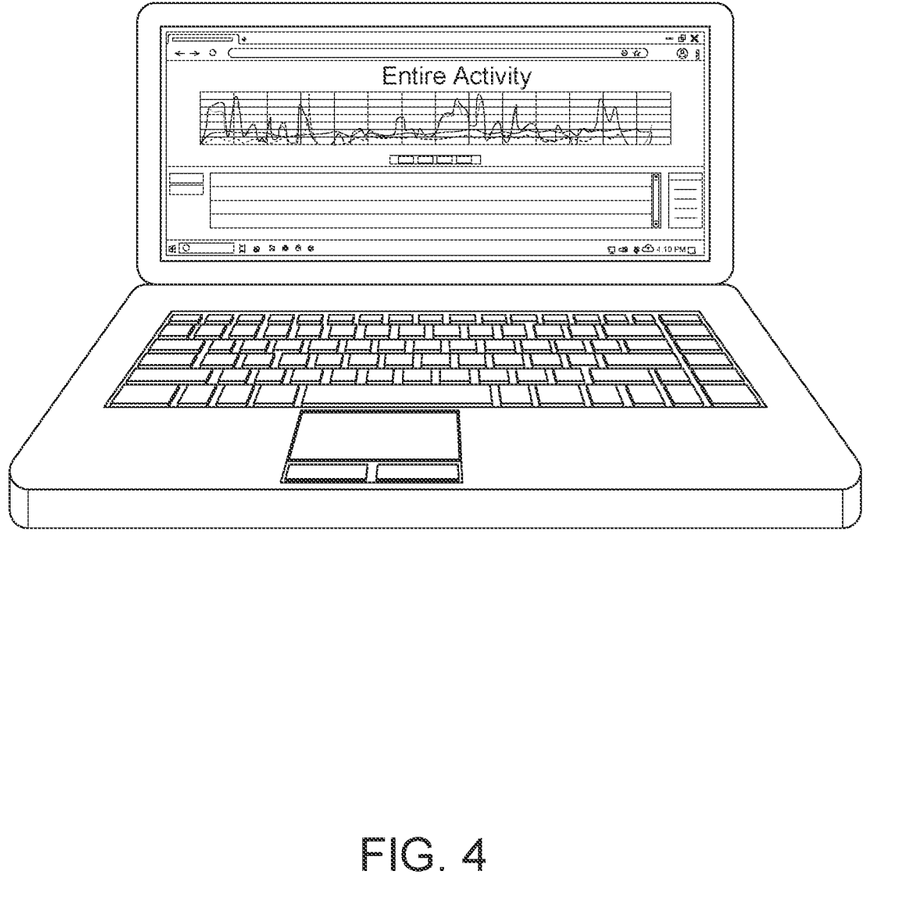
FIGS. 4 and 5 show computer readout of data collected from the power meter, as shown in on the computing device of FIG. 2 or the computing environment of FIG. 3.
Figure 5:
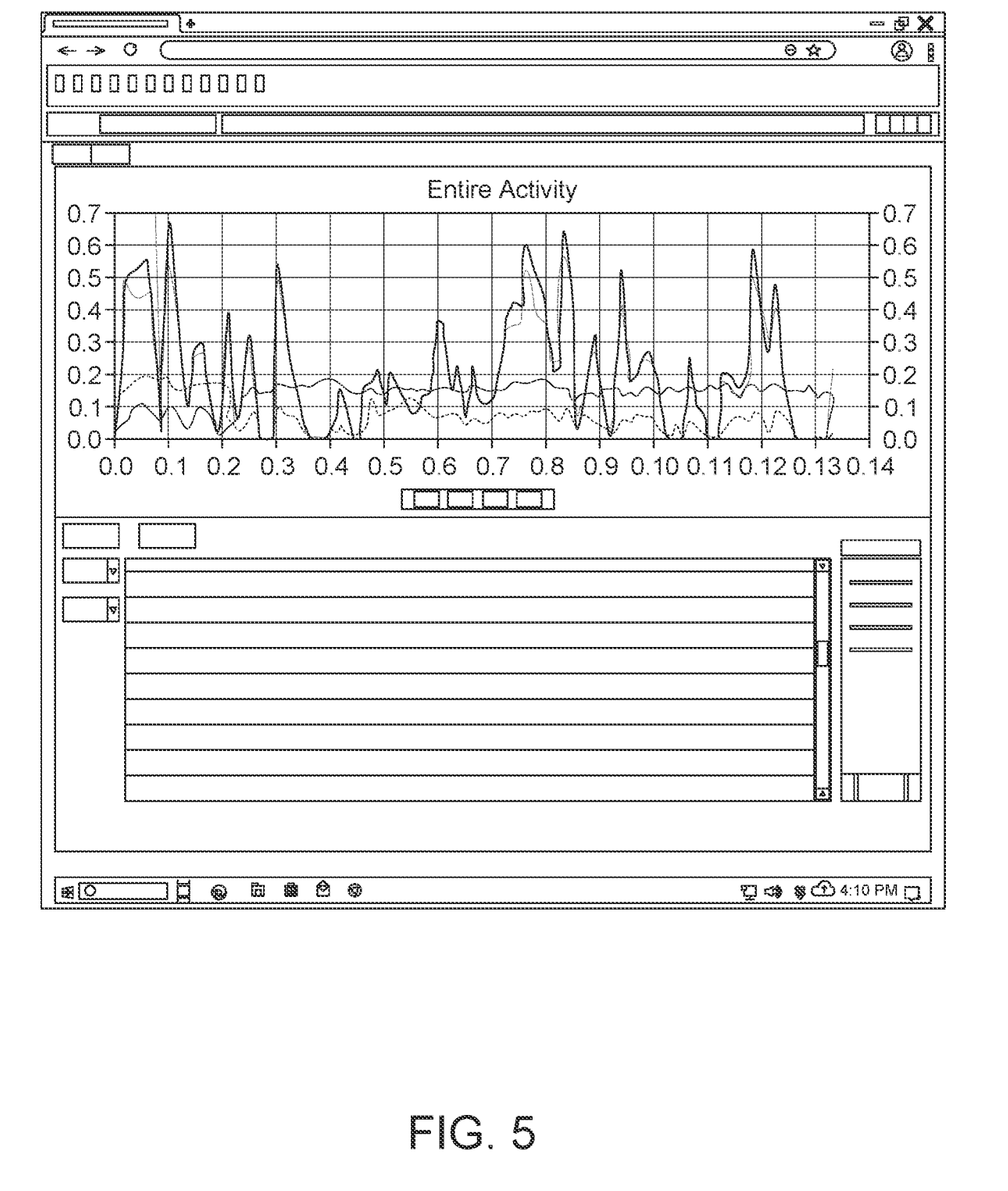

Once stored by the on board bicycle computer 200, the data so collected is then downloaded onto a personal computer by software designed for cyclists to monitor the power (for example, in Watts and Kilojoules) they produce during a training or competitive ride. See FIGS. 4 and 5 of personal computer readout of data collected from Power Meter. In embodiments, this information can also be used on the board bicycle computer 200, for the same calculation.

As previously described, in embodiments, the first energy unit measured by the bicycle power meter 100 is in Watts (a unit of electrical energy). The second unit of energy measured by the bicycle power meter 100 is Kilojoules (a mechanical unit of energy similar to and directly correlated with the more familiar unit of heat energy produced by humans burning certain quantities of food, typically referred to as Kilocalories or Kcals).

In order to measure the difficulty of a cross country course or road racing course, the Mechanical Method uses, but is not limited to, a bicycle equipped with the above described electric motor and power meter, which is then ridden over the (precision measured) course to be rated. The energy as measured by the two mechanical energy metrics (and others) required to transport the rider and cycle in this embodiment, or in the case of a remotely controlled vehicle just the vehicle, over the exact distance of the course is collected and recorded, as is the average speed in MPH for that ride on that course. Then the same bicycle with the same rider riding the same speed will ride on a standard 400 meter track, as a non-limiting example, for exactly the same distance in the same weather conditions with the same tire pressure. The increased energy, reflected as a percentage, required to propel the bike and rider, or a rider-less remotely controlled vehicle, over the cross country or road race course above that required on the track will reflect the difficulty of the course being rated.

By whatever energy collection device utilized, the energy or power consumed is collected on the course to be rated at the same controlled speeds and same exact distances as described in U.S. Pat. No. 8,142,197 energy data collection methods, and will yield energy cost differentials between courses and tracks in a similar but not equal fashion to the human metabolic energy cost differentials described in detail in the above referenced patent. This differential (represented as a percentage) between electrical/mechanical energy used by a self-propelled vehicle at controlled constant speeds for exactly equal distances on a standard 400-meter track then again on a running course will reflect the relative difficulty of that running course.

Course difficulty ratings using self-propelled vehicles, whether derived on natural terrain such as cross-country trails or on roads as in road race courses, just as the metabolic/human energy differentials, are in fact percentages of the increased energy required by those vehicles or human subjects to traverse a course, whether on roads or trails above that which the same vehicle or human subjects required to traverse a track at the same constant speed for exactly the same distance in the same weather conditions. The present method uses mechanically derived energy metrics using self-propelled vehicles instead of metabolically derived energy metrics as with human subjects.

If such were desired, the differentials between energy data collected by the bicycle or other wheeled vehicles now on a growing number of cross country and road racing courses, could and may well establish an entirely separate rating system independent of and distinct from the existing metabolic (human produced) energy rating system known as ON COURSE RATING SYSTEMS®, LLC. But with additional course energy data collection, and with accuracy increasing with increased data collection using standard mathematical regression equations, the human and mechanical energy differentials will be correlated within the familiar existing system.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method comprising:
traversing a self-propelled vehicle over a first course and a second course;
obtaining an energy reading of the self-propelled vehicle as it traverses over the first course;
obtaining an energy reading of the self-propelled vehicle as it traverses over the second course; and
providing a course difficulty rating of the first course by comparing the energy readings collected by the self-propelled vehicle over the first course and the second course to determine an energy factor for the first course, wherein
the comparing is a differential represented as a percentage of a difference in energy costs between electrical/mechanical energy used by the self-propelled vehicle at controlled constant speeds for exactly equal distances on the first course and the second course that reflects relative difficulty of the first course,
the first course and the second course comprises different terrain, and
the second course is a flat running track.

2. The method of claim 1, wherein the first course is a cross country course or road racing course and the second course is the flat running track.

3. The method of claim 2, wherein the self-propelled vehicle used for obtaining energy levels over the first course and the second course are at a constant speed and calculated same distance.

4. The method of claim 1, wherein the self-propelled vehicle used for obtaining energy levels over the first course and the second course are at a same average speed and same distance, the energy reading is provided by a power meter mounted on the self-propelled vehicle, the power meter measures the energy levels of the self-propelled vehicle over the first course and the second course, respectively, and transmits the energy levels to a computing device to compare the energy levels of the self-propelled vehicle over the first course and the second course and convert them into the course difficulty rating of the first course.

5. The method of claim of claim 4, wherein the energy levels are converted from a torque sensed from a wheel hub of the self-propelled vehicle.

6. The method of claim 1, wherein an increased energy cost between the first course and the second course is translated into a difficulty factor.

7. The method of claim 6, wherein the energy readings are in kilojoules and a correlation between the generated kilojoules measured in the first course and the generated kilojoules measured in the second course are used to obtain the difficulty factor.

8. The method of claim 1, wherein the course difficulty rating of the first course is calculating by subtracting the second energy reading obtained from the self-propelled vehicle on the second course from the first energy reading obtained from the self-propelled vehicle on the first course, at a same speed and distance to obtain a first number and dividing the first number by the energy reading obtained on the second course.

9. The method of claim 1, wherein two different mechanical energy metrics are collected and stored in a computing system and the comparing energy levels is performed with the computing system using the stored mechanical energy metrics.

10. The method of claim 9, wherein the two different mechanical energy metrics is an average speed for a ride on the first course and the second course and kilojoules or watts on the first course and the second course.

11. The method of claim 1, wherein the self-propelled vehicle is an electric motorized vehicle and the energy reading using the self-propelled vehicle is obtained from an electronic torque sensing device and transmitted to a computing device.

12. The method of claim 1, wherein the first course is a running course and the second course is again on a standard 400 meter track.

13. A method of rating a difficulty of a running course using a self-propelled vehicle traversing a first course and a second course and being implemented on a computer and taking the form of a non-transitory computer program product on a non-transitory computer readable storage medium, comprising:
   obtaining energy readings from the self-propelled vehicle traversing the first course and the second course;
   calculating energy costs from a test of the first course and a test of the second course by calculating energy expenditure of the self-propelled vehicle that has travelled both the first course and the second course;
   determining a percentage of increased energy costs collected by the self-propelled vehicle for a known race distance and speed on the first course and for a same distance at a same speed on the second course using the same self-propelled vehicle and
   providing difficulty rate of the first course by correlating the percentage of increased energy costs to a rating system, wherein
   the first course comprises different terrain than the second course,
   the second course comprises a flat track, and
   the difficulty rating of the first course test is calculated by subtracting an energy cost obtained from the self-propelled vehicle on the second course test from an energy cost obtained from the self-propelled vehicle on the first course test, at a same speed and distance.

14. The method of claim 13, wherein the first course test is an accurately measured cross country course or road racing course and the second course test is the flat track.

15. The method of claim 13, wherein:
   the energy costs are calculated using a power meter mounted on the self-propelled vehicle,
   the power meter measures the energy levels of the self-propelled vehicle over the first course and the second course, respectively,
   the power meter transmits energy levels to a computing device to compare energy levels of the self-propelled vehicle over the first course and the second course and convert them into the difficulty rating of the first course.

16. The method of claim 13, wherein the same speed is a constant speed or an average speed on the first course test.

17. The method of claim 13, wherein an increased energy cost between the first course test and the second course test is correlated into a difficulty factor of the first course.

18. The method of claim 13, wherein the energy costs are in kilojoules and/or watts and a correlation between the generated energy costs measured in the first course test and the second course test are used to obtain the difficulty factor.

19. The method of claim 18, wherein the difficulty rating of the first course test is calculated by subtracting the energy cost obtained from the self-propelled vehicle on the second course test from the energy cost obtained from the self-propelled vehicle on the first course test, at the same speed and distance to obtain a first number and dividing the first number by the energy reading obtained on the second course test.

20. The method of claim 13, wherein two different mechanical energy metrics are collected and stored in a computing system and the comparing energy levels is performed with the computing system using the stored mechanical energy metrics.

* * * * *